(12) United States Patent
Kircher

(10) Patent No.: US 7,971,891 B2
(45) Date of Patent: Jul. 5, 2011

(54) BOARDING AND/OR ACCESS AID FOR PASSENGER VEHICLES

(76) Inventor: Werner Kircher, Ahnatal (DE)

(*) Notice: Subject to any disclaimer, the term of this patent is extended or adjusted under 35 U.S.C. 154(b) by 617 days.

(21) Appl. No.: 12/015,668

(22) Filed: Jan. 17, 2008

(65) Prior Publication Data

US 2009/0184487 A1    Jul. 23, 2009

(30) Foreign Application Priority Data

Jan. 18, 2007    (DE) .................... 20 2007 000 913 U

(51) Int. Cl.
*B60R 3/02*    (2006.01)

(52) U.S. Cl. ........................................ 280/163; 280/166

(58) Field of Classification Search ................. 280/163, 280/164.1, 166; 187/200–202; 105/444, 105/449; 414/390, 391, 399, 537; 14/71.1, 14/71.3
See application file for complete search history.

(56) References Cited

U.S. PATENT DOCUMENTS

| | | | | |
|---|---|---|---|---|
| 3,446,539 A | * | 5/1969 | Sartorio ........................... | 384/15 |
| 3,775,905 A | * | 12/1973 | Frank ............................... | 49/153 |
| 3,815,299 A | * | 6/1974 | Sorensen et al. ................... | 52/66 |
| 3,828,693 A | * | 8/1974 | Kampmann et al. ........... | 105/378 |
| 4,058,228 A | * | 11/1977 | Hall ............................... | 414/549 |
| 4,179,012 A | * | 12/1979 | Heberle ......................... | 187/201 |
| 4,608,777 A | * | 9/1986 | Okamoto ......................... | 49/214 |
| 4,869,030 A | * | 9/1989 | Clark ............................. | 52/79.6 |
| 5,332,276 A | * | 7/1994 | Blodgett, Jr. ................. | 296/26.13 |
| 5,556,250 A | * | 9/1996 | Fretwell et al. ............... | 414/558 |
| 5,636,399 A | * | 6/1997 | Tremblay et al. ............. | 14/71.1 |
| 5,641,040 A | * | 6/1997 | Grass ............................. | 187/201 |
| 5,733,026 A | * | 3/1998 | Munachen ............... | 312/334.12 |
| 5,829,945 A | * | 11/1998 | Stanley ........................ | 414/477 |
| 5,871,283 A | * | 2/1999 | Isobe et al. ..................... | 384/15 |
| 5,871,312 A | * | 2/1999 | Haninger et al. ............. | 409/134 |
| 6,010,298 A | * | 1/2000 | Cohn et al. ................... | 414/537 |
| 6,412,981 B1 | * | 7/2002 | Jacobs et al. ................... | 384/15 |
| 6,502,893 B1 | * | 1/2003 | Corliss, Jr. ................... | 296/162 |
| 7,527,467 B2 | * | 5/2009 | Edwards et al. ............. | 414/537 |
| 2006/0214386 A1 | * | 9/2006 | Watson ........................ | 280/163 |
| 2006/0245883 A1 | | 11/2006 | Fontaine et al. | |

FOREIGN PATENT DOCUMENTS

| | | |
|---|---|---|
| DE | 103 51 988 | 11/2004 |
| DE | 10 2005 055 684 | 5/2007 |
| FR | 2 887 504 | 12/2006 |
| GB | 2 405 852 | 3/2005 |

* cited by examiner

*Primary Examiner* — Hau V Phan
*Assistant Examiner* — Vaughn T Coolman
(74) *Attorney, Agent, or Firm* — Michael J. Striker

(57) ABSTRACT

A boarding and/or access aid for vehicles with passenger carrying service contains a frame with two parallel side parts (4) connected by an end profile (5), contains a step plate (2) supported in the side parts (4) in such a manner that it can be retracted and extended, and contains drive means comprising a drive motor (10) for the step plate (2). According to the invention the drive means contains two drive elements (19) designed as a chain or belt and associated one of the two side parts (4), which drive elements are arranged between guide tracks (9) and outer walls (4c) of the associated side parts (4), have a driving connection to the step plate (2) and are guided over a deflection roller (18) and a drive roller (17) connected to the drive motor (10).

11 Claims, 3 Drawing Sheets

BOARDING AND/OR ACCESS AID FOR PASSENGER VEHICLES

CROSS-REFERENCE TO RELATED APPLICATION

The invention described and claimed hereinbelow is also described in German Patent Application DE 20 2007 000 913.5 filed on Jan. 18, 2008. This German Patent Application, whose subject matter is incorporated here by reference, provides the basis for a claim of priority of invention under 35 U.S.C. 119(a)-(d).

BACKGROUND OF THE INVENTION

The present invention relates to a boarding and/or access aid.

Boarding and access aids of this type are known in many forms. They are used with vehicles for passenger carrying service, e.g., with busses and track vehicles in public local traffic and facilitate the boarding of and alighting from vehicles in that a step plate that can be moved on the particular vehicle, can also be optionally pivotably mounted and is in the form of a ramp, a linear step or the like can be extended in the area of stops. Of course, the designation of boarding and access aid also comprises its use as an alighting and exiting aid.

The step plate, consisting e.g., of aluminum and provided with an anti-slip coating, can be provided in a rear area with wheels. Alternatively, the step plate can also consist of a running board arranged at the front and of a rolling carriage coupled in an articulated manner to its rear end and comprising wheels. The wheels are supported in the side parts of a frame mounted under the vehicle bottom in such a manner that they can move back and forth. This construction has the purpose of positioning the step plate preferably before the opening of a vehicle door between a standing and waiting area for persons to be transported, e.g., a platform, and between a bottom area in the boarding area of the vehicle in order to compensate any differences in level and/or any gap between these two areas or to make it easier to pass. This also makes it easier, e.g., for people in wheelchairs and those using baby buggies to board and alight. After the end of the alighting and boarding phase and possibly after the closing of the vehicle doors the step plate is returned to its starting position.

In a known boarding and/or access aid of the initially designated species (DE 103 51 988 A1) not only the running tracks for the wheels but also the drive means required for moving the step plate back and forth are housed in the frame fastened under or in the vehicle bottom. The drive means include a motor arranged in the back area of the frame and a crank gear connected to it and to the step plate and/or to the rolling carriage and arranged in a middle area of the frame. This does result in the advantage that the step plate can be mounted together with the associated functional and drive parts and with the frame as a complete structural unit on the vehicle bottom. The structure of the drive means, which is relatively complicated and therefore associated with high production costs, and the circumstance that it is difficult when using high-performance drives to maintain the low overall height required for the structural unit are problematic.

A non-published application of the same applicant suggested providing a threaded spindle or a toothed belt instead of the crank gear (DE 10 2005 684). However, even such drive means are associated with high production costs and can only be used with low overall heights if the step plate is provided on its bottom with recesses for at least partially receiving the toothed belts or the like. However, that would be associated with a mechanical weakening of the step plate and would make additional measures necessary for meeting the usual static requirements placed on such step plates.

SUMMARY OF THE INVENTION

The invention therefore has the basic problem of designing the boarding and/or access aid of the initially cited species in such a manner that it can be produced with a low overall height and economically in spite of using a high-power drive.

The invention has the advantage that the drive unit only requires economical belt or chain drives, aside from the motor. In addition, since the drive elements coupled to the step plate are located on the outsides of the guide tracks for the step plates a reduction of the thickness and therewith a mechanical weakening of the step plate is not necessary. This is true even if the diameters of the drive rollers for the drive elements are selected to be only slightly smaller than the overall height of the entire structural unit. Moreover, the advantage results that the U-shaped side parts receiving the belt- or chain-shaped drive elements can be readily sealed against the inside in order arrange each of these drive elements in a substantially closed housing and to thus protect them from contaminants without substantial extra expense and in a simple manner.

The invention is explained in detail in the following using exemplary embodiments in conjunction with the attached drawings.

DESCRIPTION OF THE PREFERRED EMBODIMENTS

Figure 1:
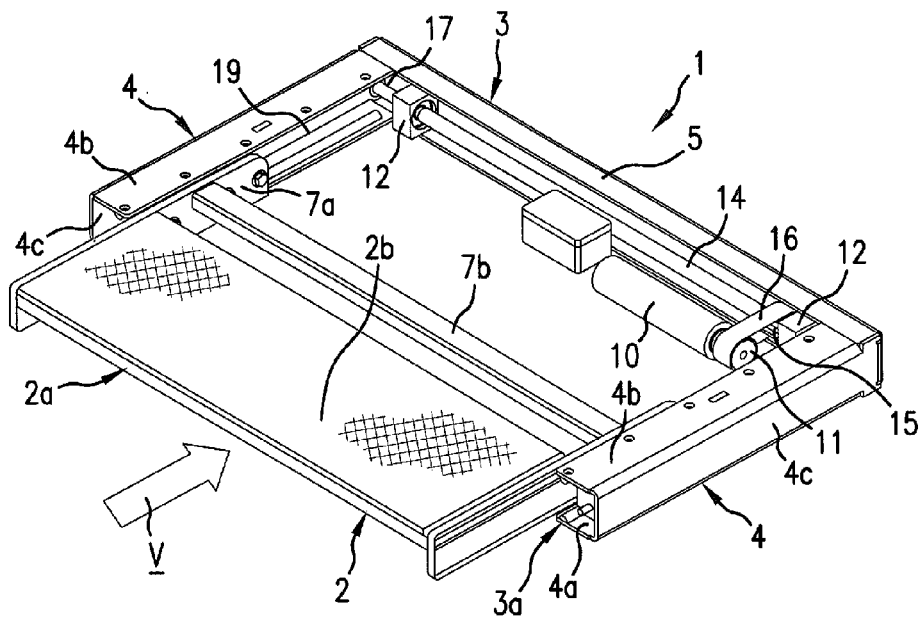
FIG. 1 shows a schematic perspective view of a boarding and/or access aid with the frame, a step plate mounted on the latter in such a manner that it can be moved in and out, and with drive elements coupled to the step plate.
Figure 2:
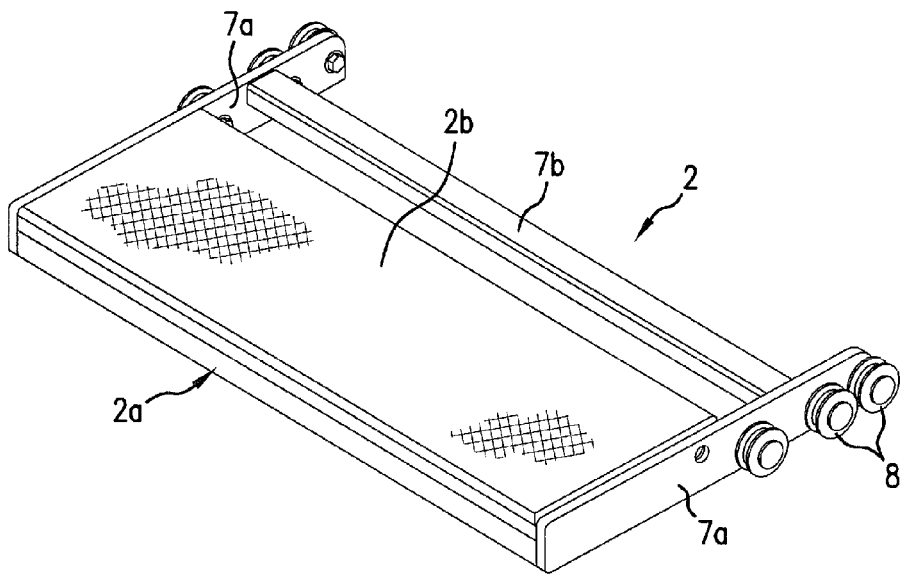
FIG. 2 shows a schematic perspective view of a step plate movably guided in the frame of the boarding and/or access aid according to FIG. 1 and designed on its rear side as a rolling carriage.
Figure 3:
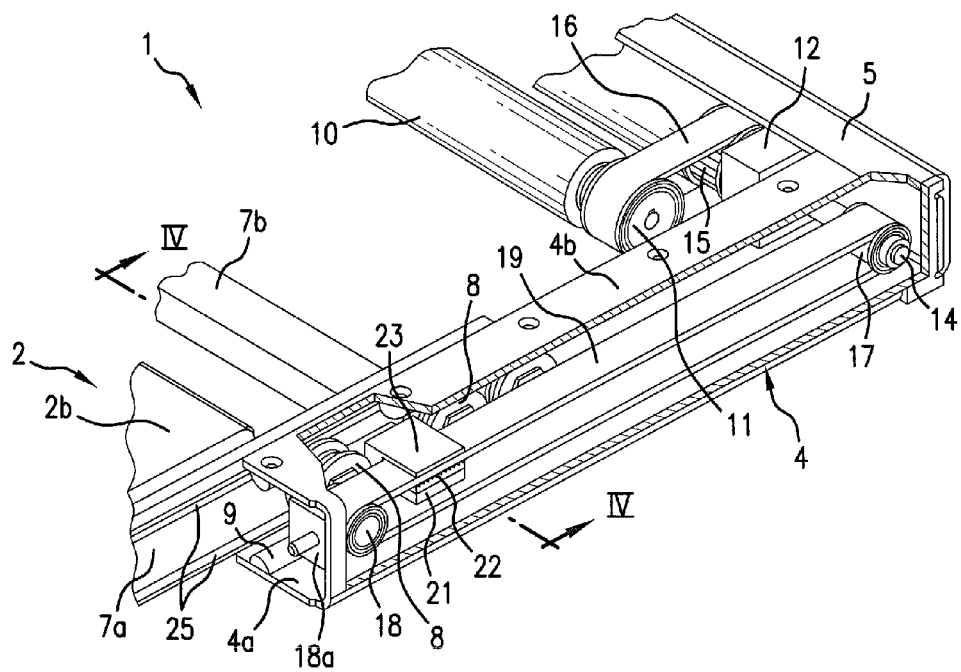
FIG. 3 shows a schematic and perspective, partially exploded partial view of the boarding and/or access aid according to FIG. 1.

FIG. 1 shows a boarding and/or access aid 1 with a step plate 2 that is constructed, e.g., on a bus or the like. Boarding and/or access aid 1 according to FIG. 1 comprises a rectangular frame 3 with two parallel side parts 4 connected on rear ends by an end profile 5 and preferably in an, e.g., central part at a distance from it by at least one additional support. Side parts 4 are preferably designed as inwardly open, U-shaped guides in which a rolling carriage 7 (FIG. 2) of step plate 2 which carriage is composed of two side plates 7a and a cross strut 7b is movably guided, preferably by wheels 8 rotatably supported on side cheeks 7a. As a result, step plate 2 can be shifted forward and backward parallel to side parts 4, and, relative to the vehicle (not shown), can either be shifted forward over a front end 3a of frame 3 into an extended position visible in FIG. 1 or can be withdrawn into a retracted position in the direction of arrow v in which a front edge 2a of step plate 2 closes substantially flush with front end 3a of frame 3. Rolling carriage 7a, 7b forms, as FIG. 2 shows, an underframe of step plate 2 on whose forward section any step plate 2b is mounted that can be provided with a grate, a sheet with an anti-slip coating produced from, e.g., rubber, or the like. Furthermore, a front part of step plate 2 can be pivotably connected in a known manner instead of rigidly to rolling carriage 7a, 7b in order to form a gently downwardly sloping ramp leading to a standing or waiting area in the extended state if the standing or waiting area is not arranged at the same level as frame 3. As FIGS. 3 and 4 in particular show, side walls 4 are each formed by a bottom part 4a, a cover part 4b and an outer wall 4c connected them, as a result of which they receive a substantially U-shaped (or also I-shaped) cross section. In FIG. 3 outer wall 4c has been omitted in order to make possible a view into the interior of side part 4. Guide tracks 9 that face each other and are designed here as running tracks are purposefully fastened to bottom parts 4 as well as to cover parts 4b, in which tracks wheels 8 of step plate 2 run.

According to FIG. 1 a drive motor 10 is provided in a rear area of frame 3 which motor comprises a drive shaft arranged parallel to the axles of wheels 8 on which shaft roller 11 is fastened. Furthermore, a shaft 14 extending over the entire length of end profile 5, arranged parallel to the output shaft of drive motor 10, and with an operative connection to the latter is rotatably supported by bearing blocks 12 fastened, e.g. to end profile 5, on which shaft a roller 15 aligned with roller 11 is fastened. The two rollers 11, 15 serve to receive a preferably endless drive element 16. Drive motor 10 is preferably a reversing motor by means of which shaft 14 can be selectively rotated in one direction or the other.

According to FIGS. 1 and 3 a drive roller 17 is fastened to each end of shaft 14. These drive rollers 17 each cooperate with an associated deflection roller 18 rotatably supported in central areas of side parts 4 and in the spaces delimited by bottom- and cover parts 4a, 4b. Their support takes place with the aid of rotary supports 18a (FIG. 3) fastened to side parts 4. Moreover, deflection rollers 18 are arranged in such a manner that they are oriented with drive rollers 17 and are in alignment with them. Another, preferably endless drive element 19 runs over drive rollers 17 and deflection rollers 18. For the rest, it is clear that the axes of rotation of drive- and of deflection rollers 17 and 18, of shaft 14 and of rollers 11, 15 are purposefully exactly parallel to the axes of rotation of wheels 8.

Rollers 11, 15, that are associated with one another, as well as drive rollers 17 and deflection rollers 18 are designed as chain wheels or belt pulleys and drive elements 16, 19 guided over them are correspondingly designed as chains or belts. Toothed belts are used with particular advantage for drive elements 16, 19 which belts are toothed on their insides whereas the associated rollers are designed as toothed belt pulleys. Moreover, tightening means (not shown) for tightening drive elements 16, 19 are purposefully provided.

Figure 4:
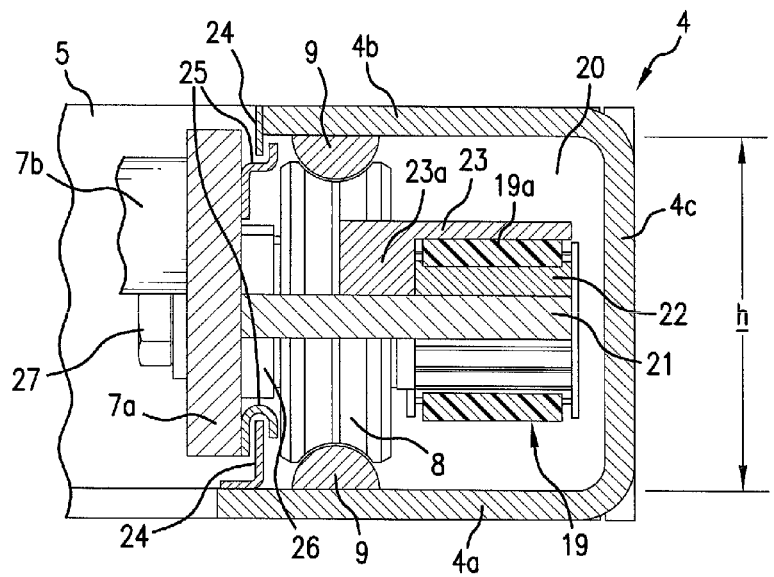
FIG. 4 shows a schematic, greatly enlarged cross section through a side part of the frame of the boarding and/or access aid approximately along line IV-IV of FIG. 3.

As FIG. 4 in particular shows, drive elements 19 including the associated drive rollers and deflection rollers are guided and arranged in a space 20 of side parts 4 that is limited on the outer sides by the bottom- and cover parts 4a, 4b as well as by outer walls 4c and on the inside by guide tracks 9 between which wheels 8 roll. Therefore, drive elements 19 rest not only on the outer sides of wheels 8 but also totally outside of step plate 2 and of rolling carriage 7a and 7b. According to FIGS. 2 and 4 this is a consequence of the fact that wheels 8 project laterally from step plate 2 and therefore form their outer delimitations transversely to the traveling direction of step plate 2.

In order that step plate 2 can be extended from frame 3 (FIG. 1) or can be a retracted into frame 3 in accordance with the direction of rotation of shaft 14, it is connected in a driving manner to drive element 19 on both sides by a rod-shaped cam element 21 schematically represented in FIGS. 3 and 4 and fastened to the particular side plate 7a. To this end cam element 21 is fastened in the exemplary embodiment by an end associated with drive element 19 to an upper belt side 19a of drive element 19. This fastening takes place, e.g., by clamping it between a preferably toothed fastening plate 22 resting on a lower side of belt side 19a, and between a clamping plate 23 resting on an upper side of belt side 19a, and it is fastened to cam element 21 by a coupling piece 23a fastened to it and by fastening screws (not shown). Belt side 19a of drive element 19 is clamped in between fastening plate 22 and clamping plate 23 in a slide-resistant manner in this manner so that it reliably entrains step plate 2 upon a movement brought about by drive roller 17 in the one direction or the other. The end of cam element 21 associated with step plate 2 is fastened for this purpose, e.g., with screws to side plate 7a of the rolling carriage. According to FIG. 3 it can extend, e.g., through a space left free between two wheels 8.

The described design and arrangement of the drive for step plate 2 has the advantage that on the one hand the thickness of step plate 2 and on the other hand the diameters of drive rollers 17 can be extended substantially over the entire height h (FIG. 4) of the inner sides of the frame profile and of side parts 4. As a result, neither recesses are necessary in step plate 2 with the consequence of a mechanical weakening in order to create space for drive elements 19 in this manner, nor do the diameters of drive rollers 17 have to be designed undesirably small in order to keep the total drive small in order to favor the step plate thickness. Therefore, practically the entire available height h of frame 3 can be used for step plate 2 as well as for drive elements 17, 18, 19.

Another substantial advantage of the described drive consists of the fact that space 20 in which drive elements 17, 18, 19 are arranged is sealed practically all the way around. This can be improved even more in that the inner sides of side parts 4 located opposite outer walls 4c are sealed with additional seals 24 and 25 preferably designed as labyrinth seals. Seals 24 are arranged, e.g., on the inner sides of bottom parts and cover parts 4a whereas seals 25 are fastened to side plates 7a of step plate 2. An extension of seals 24 and 25 that extends deeper is limited by axles 26th of wheels 8. Since these axles 26 receive the rotary bearings (e.g., ball bearings) for wheels 8 they preferably have a comparatively large diameter. In addition, they rest on the outer sides of side plates 7a and are fastened to them from the inside by screws 27 or in some other manner. The circumstance that a comparatively large slot forms between the sealing lips 24 when step plate 2 is extended out is not a disadvantage since this takes place only when the vehicle is standing still and step plate 2 is completely retracted again before it goes further. Side parts 4 therefore form excellent protective housings at the same time for drive elements 18, 19 including wheels 8 and therefore an effective protection of these parts from contamination or damage during operation without further auxiliary measures.

Figure 5:
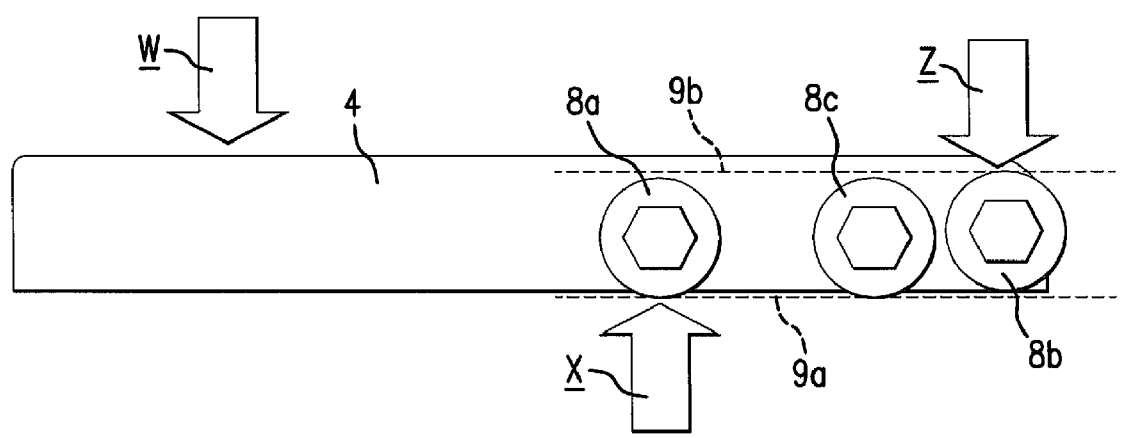
FIG. 5 shows a schematic side view from the inside onto three wheels of the rolling carriage in accordance with FIG. 2 and shows a side part of the frame of the boarding and/or access aid according to FIG. 1.

Another preferred exemplary embodiment of the invention contains, in accordance with FIG. 5, a special arrangement of wheels 8. In FIG. 5 three pairs of wheels 8a, 8b and 8c are shown that are guided in side parts 4 of frame 3, which parts oppose each other. Dotted lines 9a, 9b show the positions of the lower and upper running tracks 9 (FIG. 4) on one of the two participating side parts 4. In order that wheels 8 can readily roll between these running tracks 9*a*, 9*b* and not clamp up, they are separated by a dimension somewhat greater than the diameter of wheels 8*a*, 8*b* and 8*c*. Furthermore, wheel pair 8*a*, that is the first in the extended direction of step plate 2, is supported on lower running tracks 9*a* in such a manner that it has some clearance from upper running tracks 9*b*. On the other hand, the rear wheel pair 8*b* is supported on upper running tracks 9*b* in such a manner that that it has some clearance from lower running tracks 9*a*. This brings it about that when a force is exerted in the direction of an arrow w, as will be the case in the extended state, no tipping moment is exerted on step plate 2. However, in the retracted state tipping moments might result on account of customary vibrations or the like that press wheel pair 8*a* upward and wheel pair 8*b* downward (arrows x and z), which could cause undesired clapping noises. Therefore, in accordance with the invention at least a third, middle wheel pair 8*c* is provided that can preferably be adjusted in height and is arranged in such a manner that it is also supported on the lower (or upper) running tracks 9*a* (or 9*b*). If this wheel pair 8*c* is arranged, e.g., close to rear wheel pair 8*b* (FIG. 5), then step plate 2 is firmly supported in the extended as well as in the retracted state on wheel pairs 8*a* to 8*c*, so that tipping movements are largely prevented.

If it is desired or necessary to protect even the drive parts 10 to 16 from contaminants or damage, a bottom (not shown) covering frame 3 toward the bottom can be fastened to the lower sides of side parts 4 and of end profile 4 and optionally of the support strut(s), which bottom protects the inner area of frame 3 and the parts located in it. This bottom preferably comprises a pivotable service flap (also not shown) that can be pivoted downward and makes a simple access possible as needed, in spite of the covering, in particular to drive parts 10 to 16 located in the rear area of frame 3, which is advantageous for purposes of service (cleaning, repair, maintenance, etc.) and makes a bothersome disassembly of the entire frame 3 or the like unnecessary. Alternatively, it can be provided that the bottom is extended onto to a rear support strut and that the service flap is pivotably fastened to this support strut by a hinge frame or the like.

The invention is not limited to the exemplary embodiments described, that can be modified in many ways. It can be sufficient for frames 3 with rather small structural sizes to provide an additional support strut only on front end 3*a* of frame 3 instead of also or only in a central part, to optionally omit the service flap and to provide instead of it, e.g., a bottom that can be readily disassembled on the lower side of frame 3. Furthermore, the invention is not limited to the described design of the drive unit. It would also be possible to support step plate 2 in such a manner that it could be shifted in side parts 4 in a manner other than the one described. Furthermore, it can be advantageous for achieving a ready ability to shift step plate 2 and rolling carriage 7 to produce wheels 8 from a rubber-like material or a plastic instead of steel, as is customary. It is furthermore clear that the output shaft of drive motor 10 (FIG. 1) could also be the output shaft of a transmission connected in after motor 10. Moreover, drive element 19 could be manufactured from a belt or the like comprising, e.g., two ends connected to one another by parts 22, 23. It would also be possible to entirely omit its lower belt side and to wind the two ends of drive element 19 onto rollers 17, 18 and to roll them all from the latter. Finally, it is understood that the various features can also be used even in combinations other than the ones described and represented.

The invention claimed is:

1. A boarding and access aid for vehicles with passenger carrying service, containing a frame (3) with two parallel side parts (4) connected by an end profile (5), which side parts are formed by a bottom part (4*a*), a cover part (4*b*) and an outer wall (4*c*) connecting the both of them, containing a step plate (2) supported in the side parts (4) in such a manner that it can be retracted and extended, and drive means for the step plate (2), which means comprises a drive motor (10), which drive motor (10) is arranged in a rear area of the frame (3) and in which the bottom parts and cover parts (4*a*, 4*b*) comprise guide tracks (9) for the step plate (2), characterized in that the drive means contains two drive elements (19) designed as a chain or belt and each associated with one of the two side parts (4), and that these drive elements (19) are arranged between the guide tracks (9) and the outer walls (4*c*) of the associated side parts (4), have a driving connection to the step plate (2) and are guided over a deflection roller (18) and a drive roller (17) connected to the drive motor (10), and inner sides of the side part (4) located opposite the outer wall (4*c*) are sealed with seals (24, 25), wherein the seals are labyrinth seals, and wherein one of the seals (24) is arranged on an inner side of the bottom parts and cover parts (4*a*), whereas the other of said seals (25) is fastened to a side plate (7*a*) of the step plate (2).

2. The boarding and access aid according to claim 1, characterized in that both drive rollers (17) are connected by a shaft (14) with an operative connection to the drive motor (10).

3. The boarding and access aid according to claim 2, characterized in that the shaft (14) and an output shaft of the drive motor (10) are provided with rollers (11, 15) over which a further drive element (16) designed as a chain or belt is guided.

4. The boarding and access aid according to claim 3, characterized in that the drive elements (16, 19) consist of belts toothed on their inner sides and that the rollers (11, 15 and 17, 18) are provided with external toothings.

5. The boarding and access aid according to claim 4, characterized in that the guide tracks (9) are designed for guiding wheels (8) of the step plate (2) and that the wheels (8) and the rollers (11, 15, 17, 18) can rotate around axles arranged parallel to each other.

6. The boarding and access aid according to claim 5, characterized in that the driving connection of the drive elements (19) and of the step plate (2) takes place with the aid of cam elements (21) extending through a space present between two wheels (8).

7. The boarding and access aid according to claim 1, characterized in that the drive elements (16, 18, 19) are designed to be endless or have two ends connected to an endless drive element.

8. The boarding and access aid according to claim 1, characterized in that the side parts (4) are sealed on their inner sides facing away from the outer walls (4*c*) against an inner space formed by the frame (3).

9. A boarding and access aid for vehicles with passenger carrying service, containing a frame (3) with two parallel side parts (4) connected by an end profile (5), which side parts are formed by a bottom part (4*a*), a cover part (4*b*) and an outer wall (4*c*) connecting the both of them, containing a step plate (2) supported in the side parts (4) in such a manner that it can be retracted and extended, and drive means for the step plate (2), which means comprises a drive motor (10), which drive motor (10) is arranged in a rear area of the frame (3) and in which the bottom parts and cover parts (4*a*, 4*b*) comprise guide tracks (9) for the step plate (2), characterized in that the drive means contains two drive elements (19) designed as a chain or belt and each associated with one of the two side parts (4), and that these drive elements (19) are arranged between the guide tracks (9) and the outer walls (4*c*) of the associated side parts (4), have a driving connection to the step plate (2) and are guided over a deflection roller (18) and a drive roller (17) connected to the drive motor (10), the side parts (4) are sealed on their inner sides facing away from the outer walls (4*c*) against an inner space formed by the frame (3), and a bottom covering the inner space is fastened to the lower side of the frame (3) and comprises a service flap that can pivot downward and extends at least over the area of the drive means.

10. A boarding and access aid for vehicles with passenger carrying service, containing a frame (3) with two parallel side parts (4) connected by an end profile (5), which side parts are formed by a bottom part (4*a*), a cover part (4*b*) and an outer wall (4*c*) connecting the both of them, containing a step plate (2) supported in the side parts (4) in such a manner that it can be retracted and extended, and drive means for the step plate (2), which means comprises a drive motor (10), which drive motor (10) is arranged in a rear area of the frame (3) and in which the bottom parts and cover parts (4*a*, 4*b*) comprise guide tracks (9) for the step plate (2), characterized in that the drive means contains two drive elements (19) designed as a chain or belt and each associated with one of the two side parts (4), and that these drive elements (19) are arranged between the guide tracks (9) and the outer walls (4*c*) of the associated side parts (4), have a driving connection to the step plate (2) and are guided over a deflection roller (18) and a drive roller (17) connected to the drive motor (10), wherein the step plate (2) comprises at least three successive pairs of wheels (8*a*, 8*b*, 8*c*) that roll on the guide tracks (9), that one pair (8*a*) that is the front one in the extended direction rests on a lower guide track (9*a*), one pair (8*b*) that is the rear one in the extended direction rests on an upper guide track (9*b*) and one central pair (8*c*) of wheels for compensating tolerances and avoiding tipping movements rests on the lower guide track (9*a*).

11. The boarding and access aid according to claim 5, characterized in that the wheels (8) are provided with a coating of rubber or plastic or consist of rubber or plastic.

\* \* \* \* \*